May 1, 1928.
C. C. FARMER
1,668,009
FLUID PRESSURE BRAKE
Filed June 11, 1925
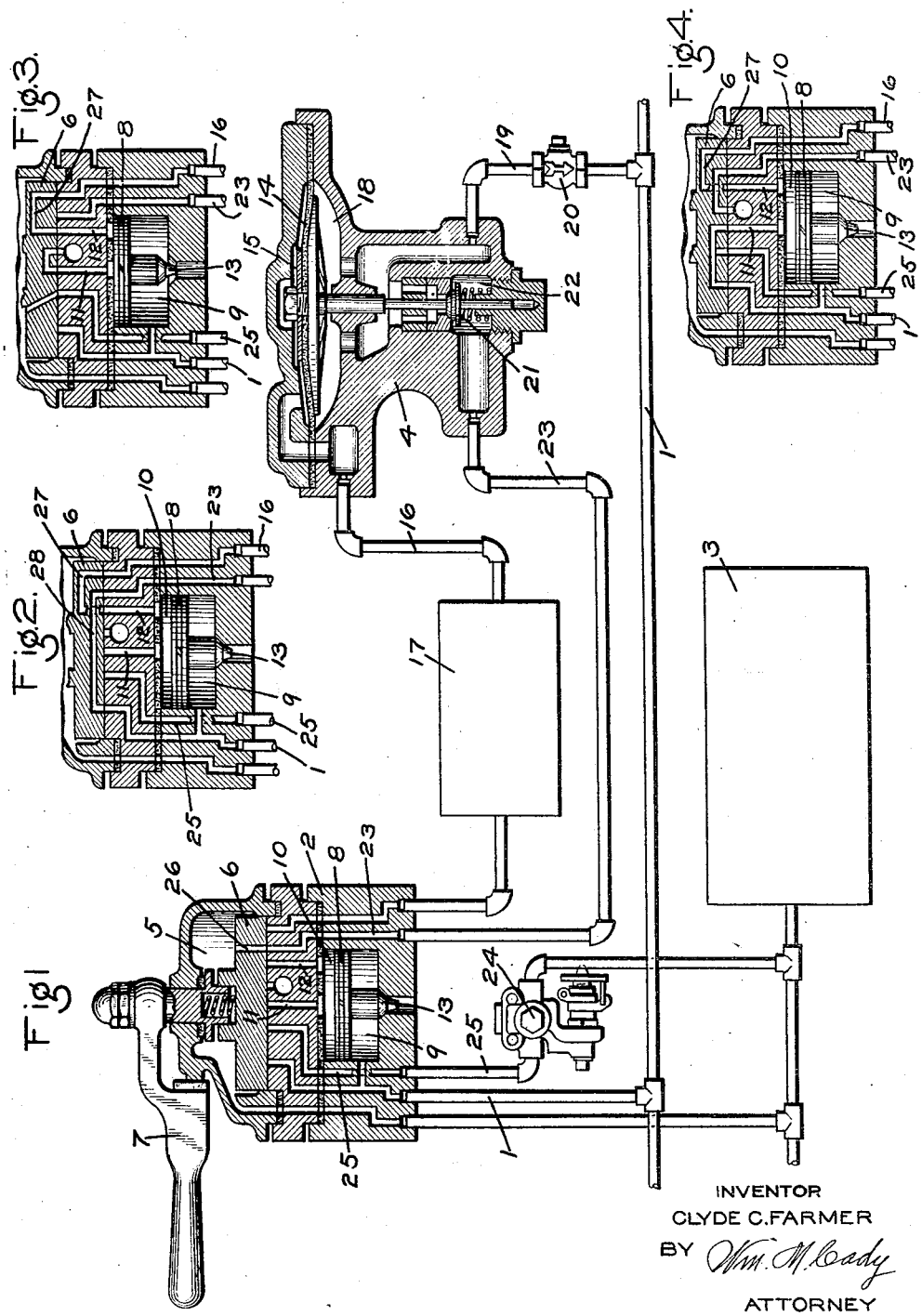
INVENTOR
CLYDE C. FARMER
BY Wm. M. Cady
ATTORNEY Patented May 1, 1928.

1,668,009

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 11, 1926. Serial No. 115,200.

This invention relates to fluid pressure brakes, and more particularly to means for maintaining the pressure in the brake pipe.

It has heretofore been proposed to provide a brake equipment in which the brake cylinder pressure is maintained against leakage at a predetermined pressure corresponding with the degree the brake pipe pressure is reduced, and means are also provided for maintaining the brake pipe pressure at the predetermined reduced degree. The maintaining of the brake pipe pressure is controlled by the operation of the brake valve device, the brake valve device being first turned to service application position to effect the desired reduction in brake pipe pressure and then to lap position, in which the brake pipe pressure maintaining means is cut into action.

When brakes of other types, not requiring the maintaining feature, are mixed in the train with brakes of the pressure maintaining type, it may be desirable to operate the brakes without the brake pipe maintaining feature functioning.

The principal object of my invention is to provide a brake valve device adapted to be operated either so as to maintain the brake pipe pressure or so that the maintaining feature is cut out of action.

In the accompanying drawing; Fig. 1 is a diagrammatic view of a fluid pressure brake equipment embodying my invention, and showing the brake valve device in the brake pipe pressure maintaining position; Fig. 2 a sectional view of the brake valve device, showing the rotary valve in normal lap position, in which the maintaining feature is cut out of action; Fig. 3 a sectional view of the brake valve device in service application position; and Fig. 4 a sectional view of the brake valve device in running position.

As shown in the drawing, the equipment may comprise a fluid pressure brake pipe 1, a brake valve device 2, a main reservoir 3, and a brake pipe pressure maintaining valve device 4.

The brake valve device 2 may comprise a casing having a valve chamber 5, containing the usual rotary valve 6 adapted to be operated by a handle 7. An equalizing discharge valve device is mounted in the casing and comprises a piston 8, having chamber 9 at one side connected to the brake pipe 1 and the chamber 10 at the opposite side connected to passages 11 and 12, leading to the seat of the rotary valve 6.

The piston 8 is adapted to operate the usual brake pipe discharge valve 13.

The maintaining valve device 4 may comprise a casing containing a flexible diaphragm 14 having the chamber 15 at one side connected through pipe 16 with the usual equalizing reservoir 17. The chamber 18 at the opposite side of the diaphragm is connected through a pipe 19, containing a non-return check valve 20, with the brake pipe 1. Operatively connected to diaphragm 14 is a valve 21, contained in valve chamber 22, and controlling communication from valve chamber 22 to chamber 18, said valve chamber being connected to a pipe and passage 23, leading to the seat of the rotary valve 6.

The usual feed valve device 24, supplies fluid under pressure from the main reservoir 3 at a reduced pressure to pipe and passage 25, leading to the seat of rotary valve 6, and in running position of the brake valve device, fluid at the reduced feed valve pressure is supplied to the brake pipe 1.

In operation, a service application of the brakes may be effected in the usual manner by turning the brake valve handle to service position, as shown in Fig. 3. In this position fluid under pressure is vented from the equalizing reservoir side of the equalizing piston 8 and the piston is operated by the higher brake pipe pressure in chamber 9 to open the discharge valve 13 and thereby cause the venting of fluid from the brake pipe.

When the desired reduction in pressure is obtained the brake valve handle is turned to lap position and then, if it is desired to maintain the brake pipe pressure constant at the predetermined reduced pressure, the rotary valve 6 is turned to the maintaining position, as shown in Fig. 1.

In this position, communication from the chamber 10 to the equalizing reservoir 17 is cut off and fluid at the predetermined reduced pressure is bottled up in the equalizing reservoir. If the brake pipe pressure should reduce by leakage or otherwise, below the predetermined pressure in the equalizing reservoir, the diaphragm 14 of the maintaining valve device will be operated to open the valve 21. In the maintaining position, a port 26 in the rotary valve 6 registers with passage 23, so that fluid from the main reservoir 3, which is constantly supplied to rotary valve chamber 5, is supplied to valve chamber 22. Consequently when the valve 21 is unseated, fluid under pressure is supplied to chamber 18 and thence to the brake pipe 1. When the brake pipe pressure has thus been increased to substantially equal the pressure of fluid in the equalizing reservoir, the diaphragm 14 will be operated to close the valve 21.

If it is not desired to maintain the brake pipe pressure while the brakes are applied, the brake valve handle is turned to the usual lap position, as shown in Fig. 2, in which the equalizing reservoir 17 remains connected to the chamber 10 through cavity 27 in the rotary valve 6, while passage 23 is cut off from the main reservoir supply.

As shown in the drawing, the passage 23 is connected in lap position through cavity 28, with the brake pipe 1, but this is not essential to the operation.

It will now be seen that the engineer may at will either maintain the brake pipe pressure after a service reduction in brake pipe pressure has been effected or he may move the brake valve handle to the usual lap position, in which the brake pipe pressure will not be maintained.

Having now described my invention, what I claim as new and desire to secure by Letters Patent, is:—

1. In a fluid pressure brake, the combination with a brake pipe and means for maintaining the brake pipe pressure at a predetermined degree, of a brake valve device having the usual positions of running, service, and lap and an additional position in which said means is cut into action, said means being cut out of action in the usual lap position.

2. In a fluid pressure brake, the combination with a brake pipe, of a reservoir, a brake pipe maintaining valve device comprising a movable abutment subject to the opposing pressures of said reservoir and the brake pipe, a valve operated by said abutment for supplying fluid to the brake pipe, and a brake valve device having the usual running position, the usual service position for venting fluid from said reservoir, the usual lap position, and an additional position in which said valve device is operative.

3. In a fluid pressure brake, the combination with a brake pipe, of a reservoir, a brake pipe maintaining valve device comprising a movable abutment subject to the opposing pressures of said reservoir and the brake pipe, a valve operated by said abutment for supplying fluid from a source of fluid under pressure to the brake pipe, and a brake valve device having the usual service position in which fluid is vented from said reservoir, a maintaining position in which said source of fluid under pressure is connected to said valve, and the usual lap position in which the source of fluid under pressure is cut off from said valve.

4. In a fluid pressure brake, the combination with a brake pipe, a brake valve device, an equalizing reservoir, and an equalizing discharge valve mechanism operated upon a reduction in equalizing reservoir pressure for venting fluid from the brake pipe, of a maintaining valve device comprising a movable abutment subject to the opposing pressures of the brake pipe and said reservoir and a valve operated by said abutment for supplying fluid under pressure to the brake pipe, said brake valve device having the usual service position in which fluid under pressure is vented from said equalizing reservoir, a maintaining position in which a source of fluid under pressure is connected to said valve and communication from said reservoir to said equalizing discharge valve mechanism is cut off, and the usual lap position, in which the source of fluid under pressure is cut off from said valve and in which the equalizing reservoir is connected to said equalizing discharge valve mechanism.

In testimony whereof I have hereunto set my hand.

CLYDE C. FARMER.